United States Patent
Nesbit

(10) Patent No.: US 11,642,858 B2
(45) Date of Patent: May 9, 2023

(54) SYSTEMS, METHODS, AND APPARATUS FOR FLOW MEDIA ASSOCIATED WITH THE MANUFACTURE OF COMPONENTS

(71) Applicant: The Boeing Company, Chicago, IL (US)

(72) Inventor: Ashleigh R. Nesbit, Williamstown (AU)

(73) Assignee: The Boeing Company, Chicago, IL (US)

( * ) Notice: Subject to any disclaimer, the term of this patent is extended or adjusted under 35 U.S.C. 154(b) by 86 days.

(21) Appl. No.: 16/856,498

(22) Filed: Apr. 23, 2020

(65) Prior Publication Data
US 2020/0247015 A1 Aug. 6, 2020

Related U.S. Application Data

(62) Division of application No. 14/812,853, filed on Jul. 29, 2015, now Pat. No. 10,675,786.

(51) Int. Cl.
*B29C 70/54* (2006.01)
*B29C 70/44* (2006.01)
(Continued)

(52) U.S. Cl.
CPC ............ *B29C 70/443* (2013.01); *B29C 31/08* (2013.01); *B29C 64/386* (2017.08); *B29C 70/542* (2013.01); *B29C 70/547* (2013.01); *B32B 3/26* (2013.01); *B32B 5/00* (2013.01); *B32B 5/22* (2013.01); *B33Y 80/00* (2014.12); *B29C 64/10* (2017.08); *B29L 2031/30* (2013.01);
(Continued)

(58) Field of Classification Search
None
See application file for complete search history.

(56) References Cited

U.S. PATENT DOCUMENTS

| 6,627,142 B2 | 9/2003 | Slaughter et al. |
| 7,595,112 B1 | 9/2009 | Cano et al. |

(Continued)

FOREIGN PATENT DOCUMENTS

| CA | 2811984 A1 | 3/2012 |
| EP | 3023234 A1 | 5/2016 |
| GB | 2495234 A  | 4/2013 |

OTHER PUBLICATIONS

U.S. Appl. No. 14/812,853, Examiner Interview Summary Record (Ptol-413), dated Jan. 28, 2020, 2pgs.

(Continued)

*Primary Examiner* — Armand Melendez
(74) *Attorney, Agent, or Firm* — Kwan & Olynick LLP

(57) ABSTRACT

Systems, methods, and apparatus are disclosed for controlling a flow of a material through a vehicle component. In some embodiments, the methods include determining a first plurality of dimensions and a second plurality of dimensions associated with a flow medium based on one or more flow properties of the vehicle component, the flow medium including a plurality of baffle layers and a plurality of spacers. The methods may further include generating at least one baffle layer based on the first plurality of dimensions, and generating at least some of the plurality of spacers based on the second plurality of dimensions, the plurality of spacers being positioned on top of the at least one baffle layer.

20 Claims, 9 Drawing Sheets

(51) Int. Cl.
*B33Y 80/00* (2015.01)
*B32B 5/00* (2006.01)
*B32B 5/22* (2006.01)
*B32B 3/26* (2006.01)
*B29C 64/386* (2017.01)
*B29C 31/08* (2006.01)
*B29C 64/10* (2017.01)
*B33Y 50/00* (2015.01)
*B33Y 10/00* (2015.01)
*B29L 31/30* (2006.01)

(52) U.S. Cl.
CPC ....... *B32B 2250/44* (2013.01); *B32B 2262/00* (2013.01); *B32B 2307/50* (2013.01); *B32B 2307/7242* (2013.01); *B33Y 10/00* (2014.12); *B33Y 50/00* (2014.12)

(56) References Cited

U.S. PATENT DOCUMENTS

| | | | |
|---|---|---|---|
| 8,356,989 | B2 | 1/2013 | Waldrop et al. |
| 10,675,786 | B2 | 6/2020 | Nesbit |
| 2004/0017020 | A1 | 1/2004 | Loving |
| 2012/0119422 | A1 | 5/2012 | Lockett et al. |
| 2013/0266750 | A1 | 10/2013 | Grove-Nielsen |
| 2014/0000513 | A1* | 1/2014 | Leonard .............. B05C 5/027 118/410 |
| 2014/0147688 | A1* | 5/2014 | Corral .............. B29C 70/021 264/510 |
| 2014/0196833 | A1 | 7/2014 | Byron et al. |
| 2014/0217651 | A1 | 8/2014 | Grove-Nielsen |
| 2015/0054207 | A1 | 2/2015 | Stepanski |
| 2015/0136908 | A1 | 5/2015 | Hegenbart et al. |
| 2015/0147536 | A1 | 5/2015 | Lungershausen et al. |
| 2017/0028590 | A1 | 2/2017 | Nesbit |

OTHER PUBLICATIONS

U.S. Appl. No. 14/812,853, Notice of Allowance and Fees Due (Ptol-85), dated Jan. 28, 2020, 9 pgs.
U.S. Appl. No. 14/812,853, Notice of Allowance and Fees Due (Ptol-85), dated Apr. 16, 2020, 2 pgs.
U.S. Appl. No. 14/812,853, Advisory Action dated Dec. 11, 2018, 2 pgs.
U.S. Appl. No. 14/812,853, Final Office Action dated Sep. 19, 2018, 14 pgs.
U.S. Appl. No. 14/812,853, Non Final Office Action dated Mar. 12, 2018, 14 pgs.
U.S. Appl. No. 14/812,853, Non Final Office Action dated May 2, 2019, 15 pgs.
U.S. Appl. No. 14/812,853, Restriction Requirement dated Nov. 15, 2017, 7 pgs.
Canadian Application Serial No. 2,931,426, Office Action dated Apr. 18, 2019, 6 pgs.
Chen, Renliang, Flow Modeling and Simulation for Vacuum Assisted Resin Transfer Molding Process with the Equivalent Permeability Method, Society of Plastics Engineers, 2004; pp. 146-164.
Chinese Application Serial No. 2016106057252, Office Action dated Aug. 5, 2019, 8 pgs.
European Application Serial No. 16180565.0, Search Report dated Jan. 2, 2017, 11 pgs.
Hipolite, Whitney, The Electroloom Becomes the World's First 3D Printer of Fabric—Launches on Kickstarter, 3D Printer Buyers Guide, May 16, 2015; 7 pgs.
Russian Application Serial No. 2016118816/11, Office Action dated Apr. 4, 2019, 16 pgs.
Canadian Application Serial No. 3,105,870, Office Action dated May 5, 2022, 3 pgs.

* cited by examiner

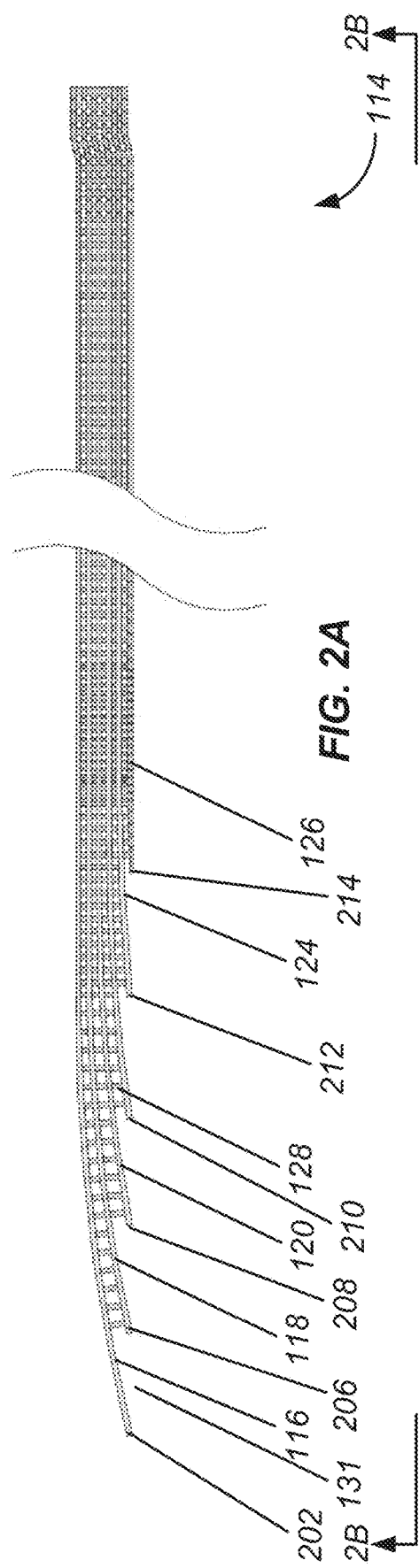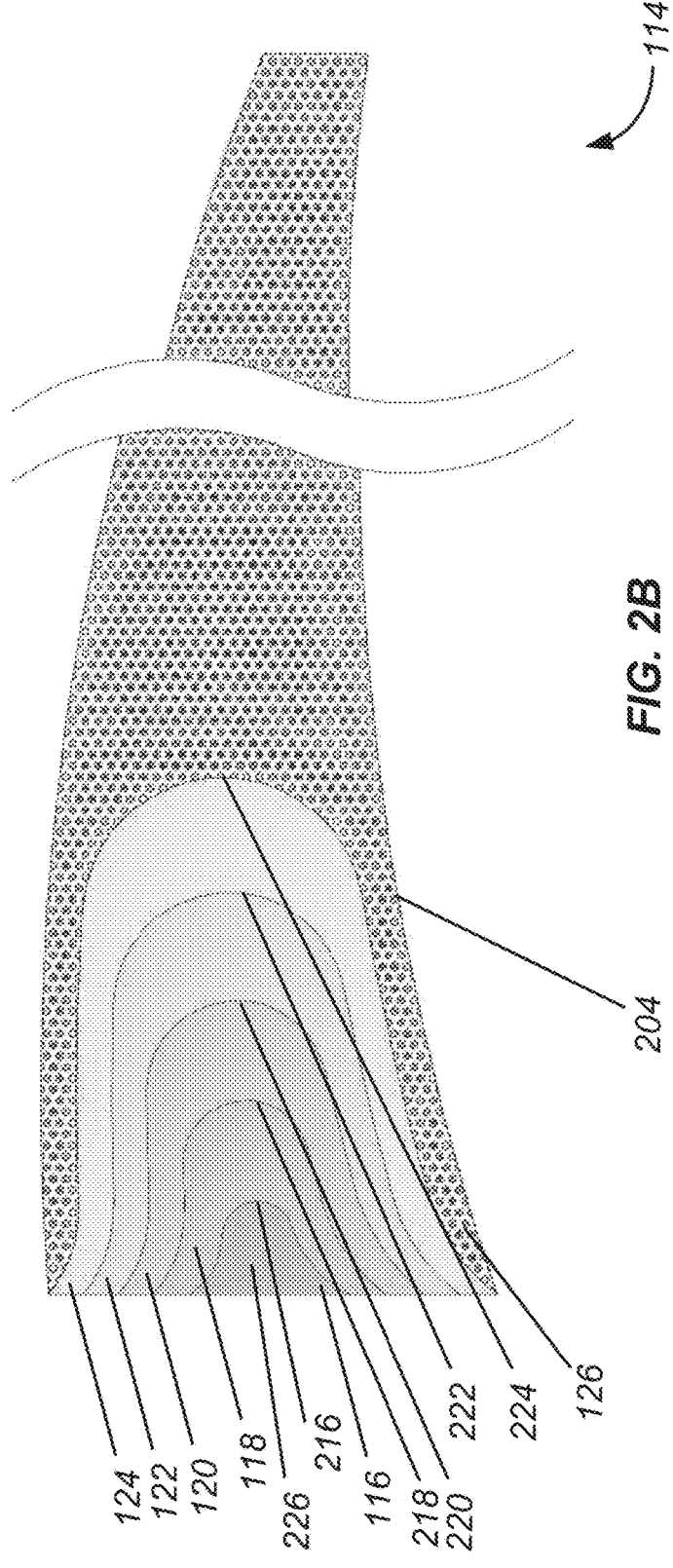

SYSTEMS, METHODS, AND APPARATUS FOR FLOW MEDIA ASSOCIATED WITH THE MANUFACTURE OF COMPONENTS

CROSS-REFERENCE TO RELATED APPLICATIONS

This application is a divisional application of U.S. application Ser. No. 14/812,853, filed Jul. 29, 2015, which is incorporated by reference herein in its entirety for all purposes.

TECHNICAL FIELD

This disclosure generally relates to the manufacture and assembly of vehicle components and, more specifically, to controlling a flow of material associated with such vehicle components.

BACKGROUND

In many instances, carbon fiber may be used to make components by forming components out of a composite laminate which may be made of many different layers of carbon fiber fabric. Moreover, additional materials may be added to the composite laminate to add additional strength and reinforce the composite laminate. However, when such materials are added to the composite laminate, the infusion of materials is limited and may result in the undersaturation or impregnation of some areas of the composite laminate which might not receive enough of the material. Moreover, the infusion of materials might also result in the oversaturation of other areas. Accordingly, such infused components remain limited because they cannot be effectively infused with material.

SUMMARY

Systems, methods, and apparatus for manufacturing, using, and otherwise controlling a flow of a material through a vehicle component are disclosed herein. Disclosed herein are methods for generating a flow medium associated with a vehicle component. Methods may include determining a first plurality of dimensions and a second plurality of dimensions associated with a flow medium based on one or more flow properties of the vehicle component, the flow medium comprising a plurality of baffle layers and a plurality of spacers. Methods further include generating at least one baffle layer based on the first plurality of dimensions. Methods additionally include generating at least some of the plurality of spacers based on the second plurality of dimensions, the plurality of spacers being positioned on top of the at least one baffle layer.

In some embodiments, the first plurality of dimensions and the second plurality of dimensions are determined based on a computational analysis of material flow through the vehicle component. According to some embodiments, the computational analysis identifies at least one convergence in a flow front of a flow of the material through the vehicle component. In various embodiments, the generating of the at least one baffle layer and the generating of the at least some of the plurality of spacers include three dimensional printing of the at least one baffle layer and the at least some of the plurality of spacers. In some embodiments, the at least one baffle layer includes a first baffle layer, and wherein the method further includes generating a second baffle layer on top of the plurality of spacers.

According to some embodiments, each baffle layer of the plurality of baffle layers has a contour, and wherein at least one space between at least some of the plurality of baffle layers defines at least one flow path. In various embodiments, the plurality of baffle layers includes a bottom baffle layer and more than one baffle layers arranged on top of the bottom baffle layer. In some embodiments, each baffle layer of the plurality of baffle layers has an edge having a contour defining, at least in part, an area of contact between the baffle layer and the vehicle component, the edge being a leading edge that faces a material source. According to some embodiments, the vehicle component is a component of an aircraft.

Also disclosed herein are systems that include one or more processors configured to determine a first plurality of dimensions and a second plurality of dimensions associated with a flow medium based on one or more flow properties of a vehicle component, the flow medium comprising a plurality of baffle layers and a plurality of spacers. The systems also include a three dimensional printer configured to generate at least one baffle layer based on the first plurality of dimensions, and generate at least some of the plurality of spacers based on the second plurality of dimensions, the plurality of spacers being positioned on top of the at least one baffle layer.

In some embodiments, the first plurality of dimensions and the second plurality of dimensions are determined based on a computational analysis of material flow through the vehicle component. According to some embodiments, the computational analysis identifies at least one convergence in a flow front of a flow of the material through the vehicle component. In various embodiments, the at least one baffle layer includes a first baffle layer, and further includes generating a second baffle layer on top of the plurality of spacers. In some embodiments, the plurality of baffle layers includes a bottom baffle layer and more than one baffle layers arranged on top of the bottom baffle layer. According to some embodiments, each baffle layer of the plurality of baffle layers has an edge having a contour defining, at least in part, an area of contact between the baffle layer and the vehicle component, the edge being a leading edge that faces a material source.

Further disclosed herein are methods for controlling a flow of a material through a vehicle component. The methods include placing vehicle component and a flow medium onto a support member, sealing a vacuum bag around the vehicle component and flow medium, the sealing of the vacuum bag generating a chamber having an airtight seal, the chamber being coupled to a material source and a vacuum pump, and controlling, using one or more flow paths of the flow medium, a flow front of a flow of material through the vehicle component.

In some embodiments, the one or more flow paths include a first flow path formed by a first baffle layer and a second baffle layer, the first flow path having at least one flow property determined, at least in part, by a first plurality of spacers positioned between the first baffle layer and the second baffle layer. According to some embodiments, the one or more flow paths further include a second flow path formed by a third baffle layer and a fourth baffle layer, the second flow path having at least one flow property determined, at least in part, by a second plurality of spacers positioned between the third baffle layer and the fourth baffle layer. In various embodiments, the methods further include generating, using the vacuum pump, a first pressure within the chamber, the first pressure being less than an atmospheric pressure, and releasing the material into the chamber, the material being released from the material source. In some embodiments, the material is a resin, and wherein the vehicle component is a preform-laminate.

While numerous embodiments have been described to provide an understanding of the presented concepts, the previously described embodiments may be practiced without some or all of these specific details. In other instances, well known process operations have not been described in detail so as to not unnecessarily obscure the described concepts. While some concepts have been described in conjunction with the specific examples, it will be understood that these examples are not intended to be limiting, and other suitable examples are contemplated within the embodiments disclosed herein.

BRIEF DESCRIPTION OF THE DRAWINGS

FIG. 2A illustrates a diagram of a side view of a flow medium, implemented in accordance with some embodiments.

FIG. 2B illustrates a diagram of a bottom view of a flow medium, implemented in accordance with some embodiments.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

As discussed above, the infusion of a material, such as resin, into a composite or preform-laminate can provide additional strength to the preform-laminate, thus making the vehicle component that is being manufactured stronger. However, vehicle components may have unique and intricate geometries which cause the flow of material through the component to converge at some locations, and avoid others thus leaving "dry spots" that receive no material.

Various embodiments disclosed herein utilize flow media that may be configured to reduce the occurrence of dry spots within a vehicle component that is being infused with a material. The flow media may include several baffle layers and spacers that define flow paths parallel to the flow of material through the vehicle component. The baffle layers and spacers may be configured to facilitate distribution of material to potential dry spots of the composite preform. Accordingly, the features and characteristics of the baffle layers and spacers may be configured to modify or affect flow within the preform of the vehicle component to reduce the occurrence of such dry spots. For example, flow paths included in the flow medium may be configured to increase flow to areas identified as potential "dry spots," while maintaining or decreasing flow in other areas. In this way, flow media may be configured to ensure that the convergence of flow fronts within the vehicle component is reduced, the occurrence of dry spots is reduced, and the occurrence of oversaturation of portions of the vehicle component is also reduced.

Figure 1:
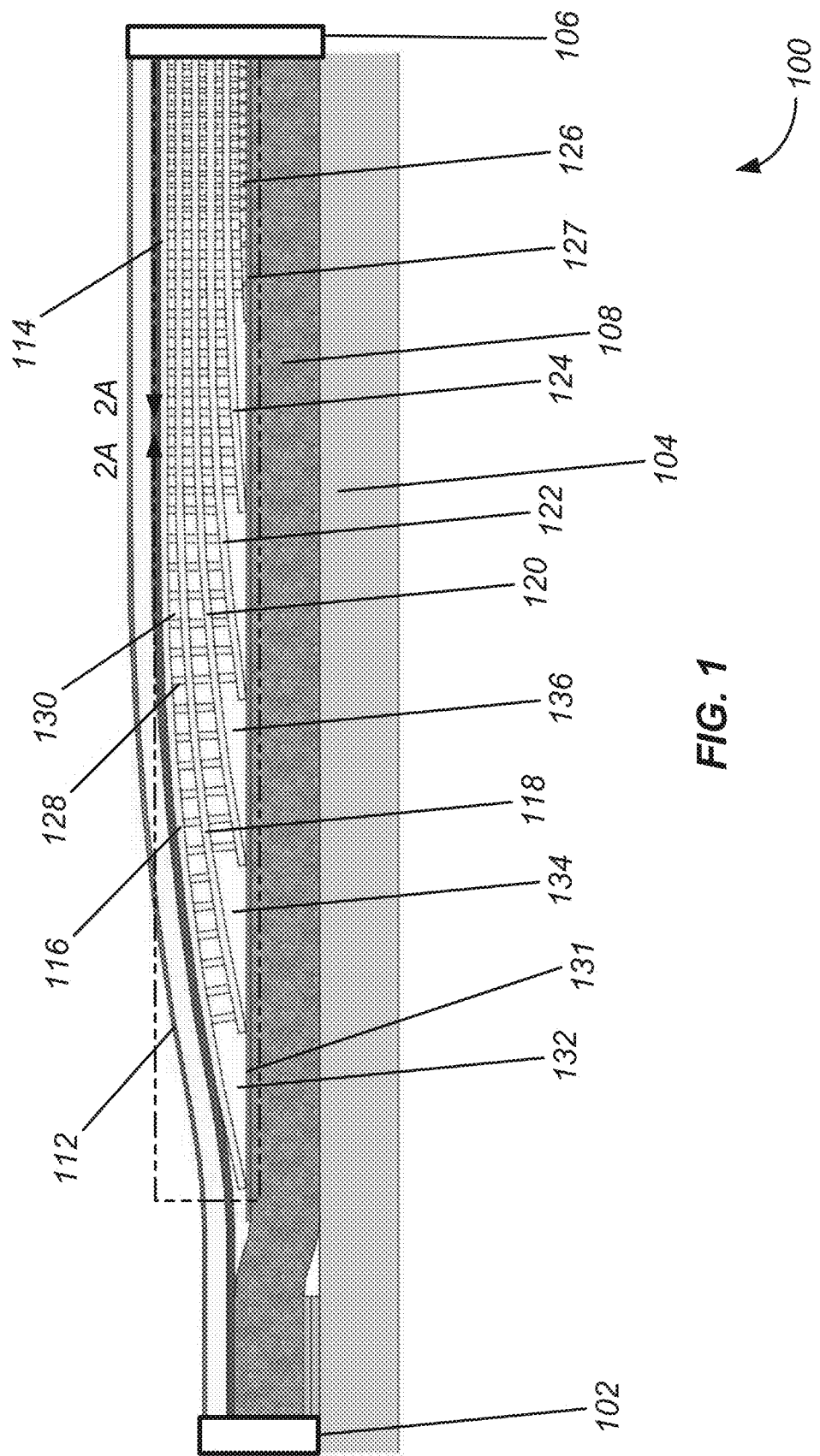
FIG. 1 illustrates a diagram of an example of system for controlling a flow of a material through a vehicle component, implemented in accordance with some embodiments

FIG. 1 illustrates a diagram of an example of system for controlling a flow of a material through a vehicle component, implemented in accordance with some embodiments. As discussed above, a material, such as a resin, may be provided and infused into a vehicle component which may be a preform-laminate that includes several layers of material, such as carbon fiber. As will be discussed in greater detail below, a vacuum may be used to draw the resin through the vehicle component and fill spaces within the vehicle component to further strengthen it and provide structural reinforcement for the vehicle component. In various embodiments, a system, such as system 100, may be implemented to control the flow of the material through the vehicle component so that convergences of flow fronts) are reduced and dry spots as well as oversaturation within the vehicle component are reduced.

Accordingly, system 100 may include material source 102. In various embodiments, material source 102 may include a reservoir that may be configured to store an amount of the material to be infused into a preform-vehicle component, such as vehicle component 108. As discussed above, the material may be a resin or any other suitable material capable of structurally fortifying vehicle component 108. Moreover, material source 102 may include conduit or tubing configured to couple the reservoir with one or more other components of system 100, such as vehicle component 108. In various embodiments, material source 102 may be configured to release the material during a fabrication process and in conjunction with the operation of vacuum pump 106. Accordingly, material source 102 may release the stored material responsive to a vacuum being applied to material source 102 as well as various other components of system 100 discussed in greater detail below.

System 100 may further include tool or mandrel-support member 104 which may be configured to provide a support platform for vehicle component 108 during infusion operations. Accordingly, tool or mandrel-support member 104 may have a shape or geometry configured to match a surface of vehicle component 108 such that vehicle component 108 is mechanically coupled to tool or mandrel-support member 104 during infusion operations, and is held in place. In various embodiments, tool or mandrel-support member 104 may be made of a material, such as a metal or polymer, which is impermeable to the material stored in material source 102.

As discussed above, system 100 may also include vacuum pump 106 which may be configured to generate a vacuum having a negative pressure relative to material source 102. As shown in FIG. 1, vacuum pump 106 is coupled to material source 102 via vehicle component 108 and flow medium 114. Accordingly, the vacuum generated by vacuum pump 106 may cause material included in material source 102 to leave material source 102 and proceed into vehicle component 108 and flow medium 114. In some embodiments, vacuum pump 106 includes a reservoir configured to collect excess material that has passed through vehicle component 108 and/or flow medium 114.

As previously stated, system 100 is coupled to or configured to include vehicle component 108. In some embodiments, vehicle component 108 may be a component of an aircraft or a spacecraft. For example, vehicle component 108 may be a rib of an airplane wing, or a top surface or a bottom surface of the airplane wing. Accordingly, vehicle component 108 may be configured to include a material having a high strength to weight ratio. For example, vehicle component 108 may be a preform-laminate made of several layers of carbon fiber fabric. In various embodiments, vehicle component 108 may be a component of a boat or other maritime vessel, or an automobile.

In various embodiments, system 100 further includes vacuum bag-film 112 which may be an impermeable layer configured to seal the components of system 100 included between vacuum pump 106 and material source 102, thus sealing the vacuum generated by vacuum pump 106 and the flow of material from material source 102. In some embodiments, film 112 is placed on top of flow medium 114 and vehicle component 108 after flow medium 114 and vehicle component 108 have been included in system 100. In various embodiments, film 112 is made of a material that is impermeable to the material stored in material source 102. In various embodiments, film 112 may be configured to have an airtight seal with material source 102 and vacuum pump 106. Moreover, tool or mandrel-support member 104 may also have an airtight seal with material source 102 and vacuum pump 106.

System 100 may also include flow medium 114. As will be discussed in greater detail below, flow medium 114 may be configured to provide one or more parallel flow paths to vehicle component 108. Each flow path provided by flow medium 114 may be configured to increase or decrease local flow in vehicle component 108 at a location adjacent to the interface, such as interface 131, between the flow path and vehicle component 108. In this way, flow medium 114 may be configured to modify and control the flow of material through vehicle component 108 at multiple different locations across vehicle component 108 as the material proceeds through vehicle component 108 during infusion operations. As will be discussed in greater detail below, flow medium 114 may include various structural members that are configured to define the shape of each flow path, as well as each flow path's flow properties. As used herein, a flow property may include a flow resistance and/or a vacuum strength which may be inversely proportional to each other. As will be discussed in greater detail below, a flow property may be a property of a flow path provided by flow medium 114 or a flow path provided by vehicle component 108. In some embodiments, porous release material 127 may be included between flow medium 114 and vehicle component 108. Accordingly, porous release material 127 may be configured to be porous to the material, which may be a resin, and may thus be configured to enable material and vacuum flow while also being configured to prevent flow medium 114 from bonding to vehicle component 108. In some embodiments, porous release material 127 may include a perforated polytetrafluoroethylene (PTFE) coated fiberglass fabric, or a perforated thin plastic sheet.

Accordingly, flow medium 114 may include several structural members, such as baffle layers and spacers. For example, flow medium 114 may include first baffle layer 116, second baffle layer 118, third baffle layer 120, fourth baffle layer 122, fifth baffle layer 124, and sixth baffle layer 126 which may also be configured to be a bottom surface of flow medium 114, as will be discussed in greater detail below. In various embodiments, a baffle layer may be made of a material, such as a metal or polymer, which is impermeable to the material stored in material source 102. For example, a baffle layer may be made of aluminum or any other suitable material impermeable to various resins used during infusion operations. Accordingly, a chamber or internal volume between baffle layers may form a flow path and may be coupled to vehicle component 108 via an interface or point of contact between flow medium 114 and vehicle component 108. The internal volume may also be coupled to vacuum pump 106. In this way, a flow path may be formed between vacuum pump 106 and vehicle component 108 via internal volumes defined by baffle layers.

For example, first flow path 132 may be defined by first baffle layer 116 and second baffle layer 118. Moreover, second flow path 134 may be formed between second baffle layer 118 and third baffle layer 120. Furthermore, third flow path 136 may be formed between third baffle layer 120 and fourth baffle layer 122. In this way, the different baffle layers may be configured to form several independent flow paths each having flow properties specifically configured to promote uniform flow throughout vehicle component 108, and reduce the occurrence of dry spots.

Flow medium 114 may also include various spacers, such as spacer 128 which may be separated from other spacers by an internal volume, such as internal volume 130. In various embodiments, the spacers may be positioned within internal volumes of flow paths defined by the baffle layers, and may thus affect the flow of material through such flow paths. Accordingly, various dimensions of the spacers, such as height and width may be configured to achieve a particular flow property of the flow path that includes the spacers. Moreover, geometries of the spacers, which may refer to their cross-sectional shape and hydrodynamic properties or shaping features, may also be configured to achieve a particular flow property. For example, spacers may have larger physical dimensions, such as larger diameters, in flow paths that have interfaces adjacent to portions of vehicle component 108 through which flow of the material is to be reduced or slowed. In another example, the spacers may have smaller physical dimensions in flow paths that have interfaces adjacent to portions of vehicle component 108 through which flow of the material is to be increased or facilitated. In this way, features of the spacers may configure, at least in part, an internal flow resistance of the flow path that includes the spacers as well as a strength of a vacuum applied to the interface of the flow path and vehicle component 108, and thus configure a localized effect of flow medium 114 on vehicle component 108.

In some embodiments, the flow property determined by the spacers and corresponding flow path, such as flow path 132, may be inversely proportional to a flow property of vehicle component 108 in a region adjacent to an interface, such as interface 131, between flow path 132 and vehicle component 108. For example, the portion of vehicle component 108 adjacent to interface 131 may be a dry spot, or area that has one or flow properties making it prone to undersaturation. Such a flow property may be equivalent to a relatively high flow resistance. In some embodiments, flow path 132, as well as spacers within flow path 132, may be configured to have a flow property and equivalent flow resistance that is relatively low and is inversely proportional to the flow property of the portion of vehicle component 108 that is adjacent to interface 131.

As will be discussed in greater detail below, different flow paths defined by different portions of flow medium 114 may be configured to have different flow properties. Moreover, the different flow paths may be configured to counteract flow properties of vehicle component 108 that may otherwise cause flow front convergences and dry spots within vehicle component 108. In this way, each flow path defined within flow medium 114 may be specifically configured based on flow properties of vehicle component 108, and may collectively reduce the occurrence of dry spots within vehicle component 108 during infusion operations.

FIG. 2A illustrates a diagram of a side view of a flow medium, implemented in accordance with some embodiments. As discussed above, flow medium 114 may include structural members that are configured to define several different internal volumes that provide additional flow paths for a material, such as resin, which may be infused into vehicle component 108. For example, flow medium 114 may include first baffle layer 116, second baffle layer 118, third baffle layer 120, fourth baffle layer 122, fifth baffle layer 124, and sixth baffle layer 126 which may also be configured to be a bottom surface of flow medium 114. As discussed in greater detail below, sixth baffle layer 126 may also include various features, such as holes, that are configured to provide additional permeability to one or more flow paths included within flow medium 114.

As was previously discussed, structural members, such as spacers, included in the flow paths may be configured to determine flow properties of the flow paths as well as flow properties of portions of vehicle component 108. As will be discussed in greater detail below with reference to FIG. 2B, a shape or contour of an edge of one or more baffle layers, such as edge 202, may be specifically configured to further affect flow properties of one or more portions of vehicle component 108.

FIG. 2B illustrates a diagram of a bottom view of a flow medium, implemented in accordance with some embodiments. As shown in FIG. 2B, flow medium 114 has a geometry that is configured to parallel or match a surface geometry of vehicle component 108. In one example, vehicle component 108 is a rib of an airplane wing. Accordingly, flow medium 114 is configured to have a shape that matches a surface of a rib of an airplane wing. In some embodiments, peripheral edges of flow medium 114, such as peripheral edge 204, may be sealed to seal edges of flow paths included within flow medium 114. As discussed above, flow medium 114 may include first baffle layer 116, second baffle layer 118, third baffle layer 120, fourth baffle layer 122, fifth baffle layer 124, and sixth baffle layer 126.

As shown in FIGS. 2A and 2B, each of baffle layers 116, 118, 120, 122, 124, and 126 may be configured to have edges 202, 206, 208, 210, 212, and 214 that have particular contours or geometries. In various embodiments, an edge of a baffle layer, such as baffle layer 116, defines an interface, such as interface 131, between the baffle layer 116 and vehicle component 108. Accordingly, a contour 216 of an edge, such as edge 206, defines, at least in part, an interface 131 of vehicle component 108 with which the flow path 132 associated with the baffle layers 116 and 118 interacts. FIG. 2B illustrates an example in which contours 216, 218, 220, 222, and 224 of the edges 206, 208, 210, 212, and 214 of the baffle layers 116, 118, 120, 122, 124, and 126 are configured to provide several staggered, unimpeded flow paths 132, 134, 136, 304, and 306, discussed in greater detail below with reference to FIGS. 3A-3F, which are configured based on a previously determined geometry of a dry spot of vehicle component 108. In this example, contours of the baffle layers 116, 118, 120, 122, 124, and 126 have been configured such that at portion 226, flow medium 114 is bounded by the top baffle layer, which is first baffle layer 116. Accordingly, all other flow paths 132, 134, 136, 304, and 306 are open and unimpeded paths. Accordingly, the contours of the leading edges 202, 206, 208, 210, 212, and 214 associated with flow paths 132, 134, 136, 304, and 306 have been configured to provide less flow resistance between vehicle component 108 and vacuum pump 106, thus increasing the overall flow through vehicle component 108 at portion 226. Further along the airplane rib as the dry spot terminates, the edges 202, 206, 208, 210, 212, and 214 associated with flow paths 132, 134, 136, 304, and 306 contact vehicle component 108, and separate flow paths 132, 134, 136, 304, and 306 are established that each have specific flow properties. In this way, open areas, such as portion 226, of flow paths 132, 134, 136, 304, and 306 as well as their dimensions may be configured to have little flow resistance, stronger vacuum strength, and promote flow within vehicle component 108. As discussed above, in various embodiments, porous release material 127 may be positioned between flow medium 114 and vehicle component 108. Accordingly, contact between edges 202, 206, 208, 210, 212, and 214 and vehicle component 108 may occur via porous release material 127.

Figure 3A:
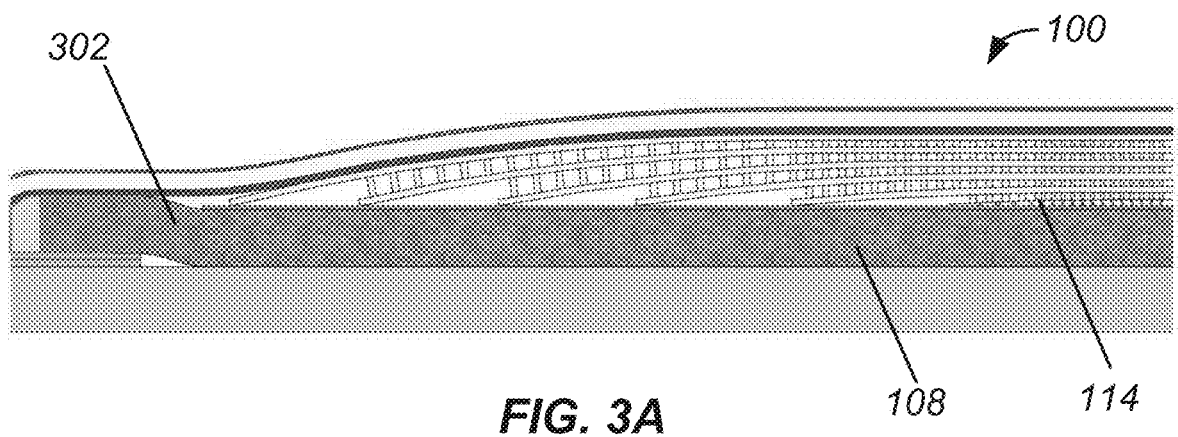
FIGS. 3A-3F illustrate diagrams of an example of a material being infused into a vehicle component, implemented in accordance with some embodiments

FIGS. 3A-3F illustrate diagrams of an example of a material being infused into a vehicle component, implemented in accordance with some embodiments. As previously discussed, system 100 may be implemented to infuse a material, such as resin, into a vehicle component. As shown in FIG. 3A, material may be provided from material source 102 and may progress through vehicle component 108 in accordance with the negative pressure gradient generated by vacuum pump 106. Accordingly, leading edge 302 of the volume of material may progress through vehicle component 108 based on flow properties of flow paths, such as flow paths 132, 134, 136, 304, and 306, established by vehicle component 108 as well as flow medium 114. As will be discussed in greater detail below with reference to FIGS. 3B-3F, as leading edge 302 progresses through vehicle component 108, the material contacts different interfaces, such as interface 131, of different flow paths 132, 134, 136, 304, and 306 that may each have their own respective flow properties configured to increase or reduce flow within vehicle component 108 at each respective interface.

Figure 3B:
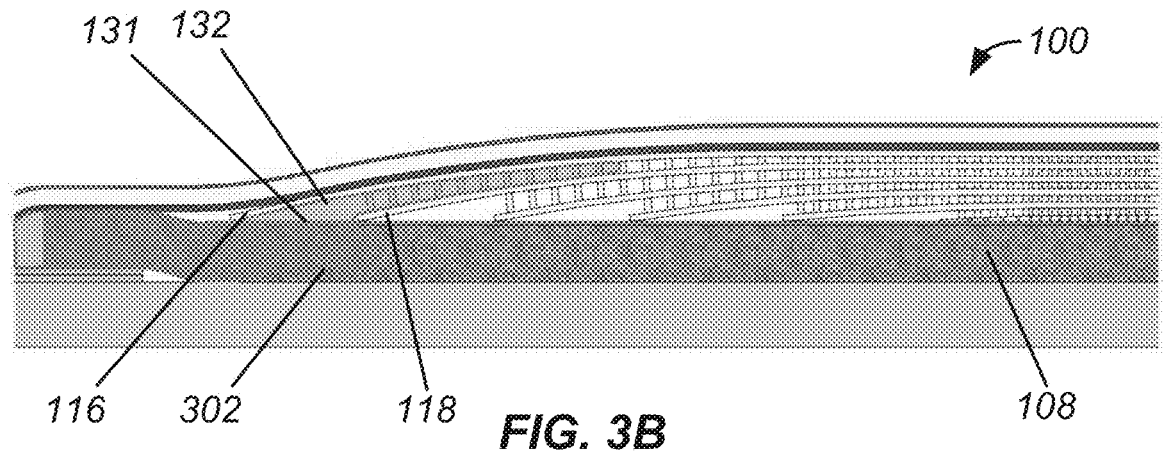

FIG. 3B illustrates material being infused into vehicle component 108 after an amount of time has elapsed, and leading edge 302 has progressed further through vehicle component 108. As shown in FIG. 3B, the material has contacted interface 131 associated with first flow path 132 which is defined by first baffle layer 116 and second baffle layer 118. Accordingly, an amount of the material has begun flowing through first flow path 132. Furthermore, the material also continues to progress through vehicle component 108. Accordingly, leading edge 302 continues to progress through vehicle component 108 and towards vacuum pump 106. As previously discussed, an amount of material and a rate of flow of the material that progresses through first flow path 132 may be determined based on structural members included in first flow path 132, which may be spacers.

Accordingly, structural characteristics of first flow path 132 may determine the amount of material wicked away from vehicle component 108 and into flow medium 114. As discussed above, the less flow resistance that first flow path 132 has, the more material is wicked away, and the more localized flow occurs within vehicle component 108 at the interface of first flow path 132 and vehicle component 108.

Figure 3C:
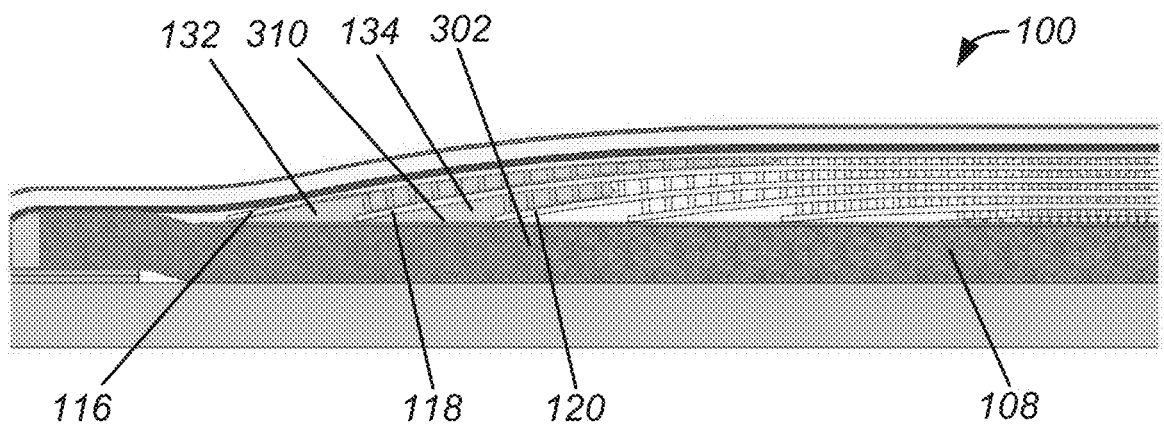
Figure 3D:
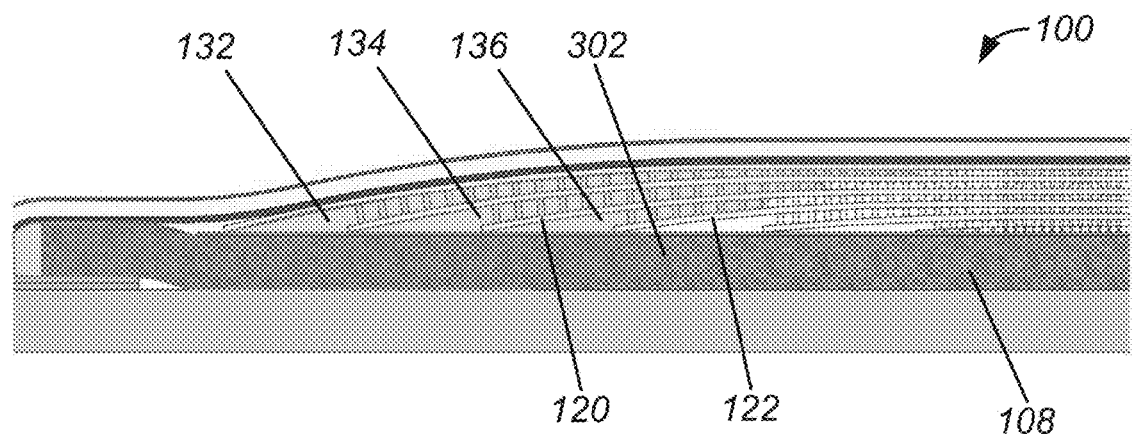

FIG. 3C further illustrates material being infused into vehicle component 108 after an additional amount of time has elapsed. As shown in FIG. 3C, leading edge 302 has continued to progress through vehicle component 108. The material has also contacted second flow path 134 which is defined by second baffle layer 118 and third baffle layer 120. Accordingly, an amount of the material has begun flowing through second flow path 134. As previously discussed, structural features or characteristics of second flow path 134 may determine a rate of flow of material through second flow path 134. Moreover, second flow path 134 may be configured to have different flow characteristics than first flow path 132, and may have a different effect on local flow within vehicle component 108 at interface 310 of second flow path 134 and vehicle component 108. In this way, different flow paths may be configured differently to increase or decrease local flow of the material along a length of vehicle component 108. Moreover, structural features or characteristics of a flow path may also be varied along a width of vehicle component 108 to provide additional configurability of the flow within vehicle component 108. As will be discussed in greater detail below, in some embodiments, the structural features or characteristics, which may include spacers, may be varied in a concentric fashion starting from an edge, such as edge 206, of a baffle layer, such as baffle layer 118. Thus, as will be discussed in greater detail below, variations in the structural features or characteristics may maintain a shape or pattern determined by a contour, such as contour 216, and may be varied along a length of vehicle component 108. FIG. 3D further illustrates material being infused into vehicle component 108 after an additional amount of time has elapsed. As shown in FIG. 3D, leading edge 302 has continued to progress through vehicle component 108. The material has also contacted third flow path 136 which is defined by third baffle layer 120 and fourth baffle layer 122. Accordingly, an amount of the material has begun flowing through third flow path 136. As previously discussed, structural features or characteristics of third flow path 136 may determine a rate of flow of material through third flow path 136. As similarly discussed above, features of third flow path 136, such as a size, shape, and density of spacers, may be configured to configure or determine a flow resistance of third flow path 136, and such flow properties may be different than those of first flow path 132 and second flow path 134. In this way, each flow path may be specifically configured to control the flow of material through vehicle component 108.

Figure 3E:
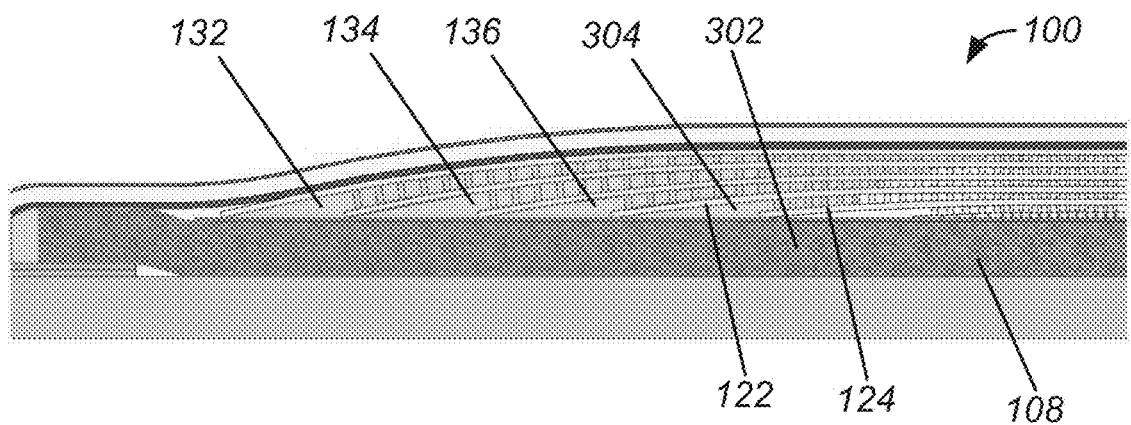

FIG. 3E further illustrates material being infused into vehicle component 108 after an additional amount of time has elapsed. As shown in FIG. 3E, leading edge 302 has continued to progress through vehicle component 108. The material has also contacted fourth flow path 304 which is defined by fourth baffle layer 122 and fifth baffle layer 124. Accordingly, an amount of the material has begun flowing through fourth flow path 304. As previously discussed, structural features or characteristics of fourth flow path 304 may determine a rate of flow of material through fourth flow path 304. Accordingly, material may continue to flow through first flow path 132, second flow path 134, third flow path 136, vehicle component 108 and now fourth flow path 304.

Figure 3F:
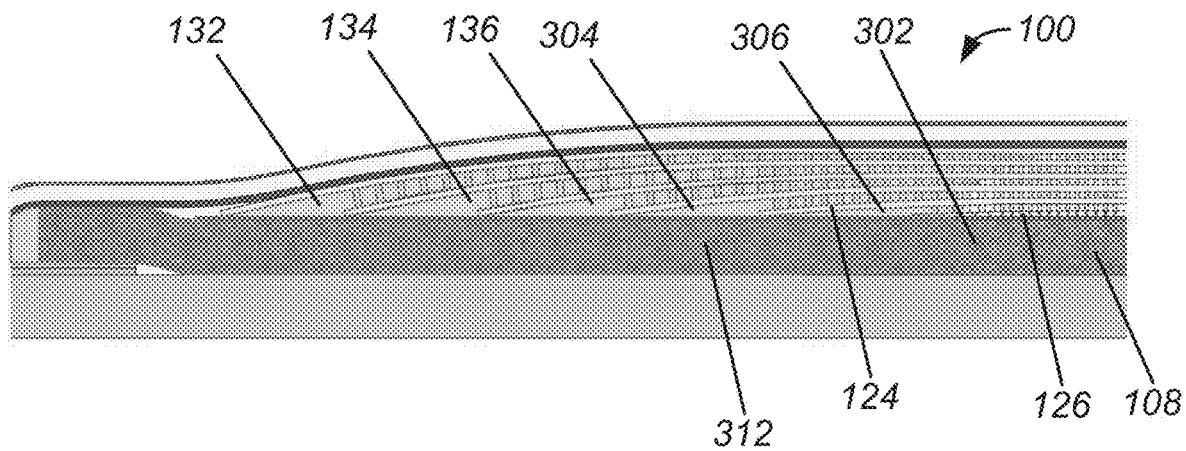

FIG. 3F further illustrates material being infused into vehicle component 108 after an additional amount of time has elapsed. As shown in FIG. 3F, leading edge 302 has continued to progress through vehicle component 108. The material has also contacted fifth flow path 306 which is defined by fifth baffle layer 124 and sixth baffle layer 126. Accordingly, an amount of the material has begun flowing through fifth flow path 306. As previously discussed, structural features or characteristics of fifth flow path 306 may determine a rate of flow of material through fifth flow path 306. In this way, numerous additional flow paths 132, 134, 136, 304, and 306 may be provided in parallel to flow path 312 of vehicle component 108. However, properties of flow paths 132, 134, 136, 304, and 306, such as flow resistance, may be configured to increase flow in some areas and decrease flow in others. Accordingly, the configuration of structural members and contours of different flow paths 132, 134, 136, 304, and 306 may provide specific or selective adjustments to flow through vehicle component 108 along a length of vehicle component 108 while the configuration of structural members across a width of flow paths 132, 134, 136, 304, and 306 may provide specific adjustments along a width of vehicle component 108.

Figure 4:
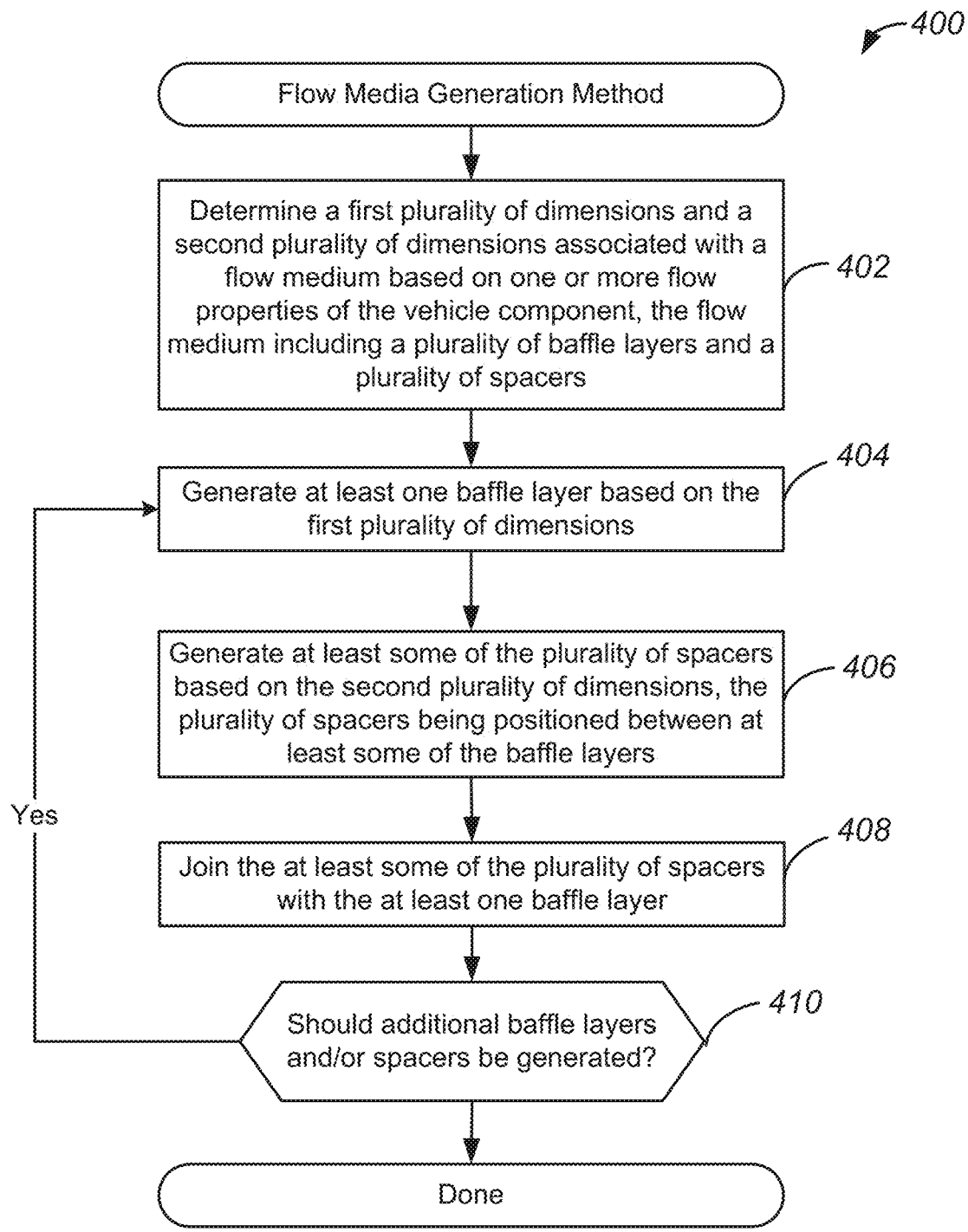
FIG. 4 illustrates a flow chart of an example of a flow medium generation method, implemented in accordance with some embodiments.

FIG. 4 illustrates a flow chart of an example of a flow medium generation method, implemented in accordance with some embodiments. As previously stated, various dimensions and features of a flow medium, such as flow medium 114, may be determined and configured based on flow characteristics and properties of the vehicle component, such as vehicle component 108, associated with flow medium 114. Accordingly, a flow medium generation method, such as method 400, may be implemented to determine the flow characteristics and properties of the vehicle component, and manufacture a flow medium that has features and dimensions that are configured based on the determined flow characteristics and properties.

Accordingly, method 400 may commence with operation 402 during which a first plurality of dimensions and a second plurality of dimensions associated with flow medium 114 may be determined based on one or more flow properties of vehicle component 108. As previously discussed, flow medium 114 includes a plurality of baffle layers and a plurality of spacers. Accordingly, the first dimensions may identify physical parameters and dimensions of the baffle layers. Moreover, the second dimensions may identify physical parameters and dimensions of the spacers. As similarly discussed above, such dimensions may be determined based on flow properties of vehicle component 108 which may identify one or more problem areas which may be areas where a flow front converges. As discussed above, the geometry and shape of vehicle component 108 may cause flow within vehicle component 108 to not be uniform. As a result, the flow of material through vehicle component 108, unaided by flow medium 114, might not be uniform, and might leave dry spots within vehicle component 108

In various embodiments, the flow properties of vehicle component 108 may be determined based on computational fluid dynamics analysis. Accordingly, a data processing system, such as data processing system 900 discussed in greater detail below with reference to FIG. 9, may be implemented to model and analyze the flow of a material, such as resin, through vehicle component 108, which may be made of a preform-laminate material such as carbon fiber. In various embodiments, the computational fluid dynamics analysis may identify at least one convergence in a flow front of a flow of the material through the vehicle component. Accordingly, the computational fluid dynamics analysis may identify dry spots, or areas having flow of less than a threshold value, and may generate a representation of a spatial distribution of the modeled flow that may form the basis for determining the first dimensions and second dimensions. In various embodiments, the data processing system may be further configured to determine the first dimensions and the second dimensions based on the generated representation of modeled flow.

In some embodiments, the computational fluid dynamics analysis may generate a fill-time heat map that identifies and characterizes individual fill-time values that may be stored in a data structure, such as a data table. For example, the data table may include rows and columns of data fields corresponding to a spatial representation of vehicle component 108. In this way, data fields of the data structure may represent pixels of a spatial representation that correspond to physical locations of vehicle component 108. The values may characterize or represent flow rates and/or fill times associated with areas of vehicle component 108. In various embodiments, boundaries may be identified based on the values included in the heat map. In some embodiments, one or more designated values may be used to determine the boundaries. In one example, a first designated value of 10 minutes may be used to identify a first boundary and a second designated value of 20 minutes may be used to identify a second boundary. Additional designated values may be implemented for 30 minutes, 40 minutes, or any other suitable unit and/or gradation of time or flow rate. More specifically, areas of vehicle component 108 having common or similar values may be associated or connected with each other to form distinct lines that may be boundaries. For example, a first boundary may be formed based on areas that have a fill-time value of 10 minutes. In this way, several boundaries may be identified, and may form the basis for determining contours 216, 218, 220, 222, and 224 of edges 206, 208, 210, 212, and 214. In various embodiments, each boundary may be separated by a distance that is directly proportional to the gradation of time units used for the designated values.

In various embodiments, the first dimensions and second dimensions may be determined based, at least in part, on the fill-time values and boundaries discussed above. For example, the first dimensions, which may include dimensions of contours 216, 218, 220, 222, and 224 of edges 206, 208, 210, 212, and 214, may be determined based on their associated boundaries and may have a similar shape as their associated boundaries. Moreover, a number of baffle layers may be determined by dividing a time difference by a designated value to generate space divisions. For example, if a gradation of 10 minutes, 20 minutes, 30 minutes, and 40 minutes is used, the time difference may be 10 minutes. In some embodiments, the designated value may be 2. Accordingly, baffle layers may be generated for every 5 minute increment in fill-time values. In this way, the fill-time differences may be utilized to characterize spatial divisions among baffle layers and determine dimensions of the baffle layers. In some embodiments, a physical distance between boundaries may be divided by a designated number to characterize spatial divisions among baffle layers and determine dimensions of the baffle layers based. In this way, spatial differences between boundaries may be utilized.

In various embodiments, the second dimensions may be determined based, at least in part on the first dimensions. As discussed above, baffle layers, such as baffle layers 116, 118, 120, 122, 124, and 126, may be configured to form various flow paths in which spacers may be positioned. As also discussed above, the spacers included in a particular flow path may vary in size and shape. In some embodiments, the spacers may be configured to have dimensions that vary uniformly and progressively along a flow path. Accordingly, the spacers may have an initial set of dimensions at the beginning of the flow path and adjacent to a contour. Such an initial set of dimensions may be a default value, or may have been previously determined by an engineer. The initial dimensions of the spacers may be configured to be open and provide relatively little flow resistance. Accordingly, the initial dimensions may be smaller, have a shape that provides little hydrodynamic resistance, and/or may have a lower density per unit of area of baffle layer. The dimensions of the spacers may be varied in a linear or non-linear fashion along the length of the flow path and in a manner that is concentric with a shape or curvature of their associated contour. More specifically a size, density, and/or shape of the spacers may be individually varied, or varied in combination. Accordingly, the dimensions may be varied to provide more flow resistance, and have dimensions that are larger, have a shape that provides more hydrodynamic resistance, and/or has a higher density. In some embodiments, the dimensions may be varied to the extent that they choke off resin flow through the flow path and thus reduce resin waste incurred by an infusion method. As similarly discussed above, dimensions may be varied from a beginning of a flow path, such as flow path 132 which may be adjacent to material source 102, to an end of the flow path which may be adjacent to vacuum pump 106.

Method 400 may proceed to operation 404 during which at least one baffle layer may be generated based on the first plurality of dimensions. In various embodiments, the at least one baffle layer may be generated using a three dimensional (3D) printing process. Accordingly, the first dimensions may be provided to a 3D printer, and the 3D printer may fabricate the at least one baffle layer as part of an automated manufacturing process. In some embodiments, baffle layers may be tooled from a material such as metal. In various embodiments, the use of a material such as metal may enable the use of reusable flow media that may be cleaned of resin after one use, and then used again in another as will be discussed in greater detail below with reference to FIG. 5. In some embodiments, baffle layers may be generated utilizing direct metal laser sintering (DMLS).

Method 400 may proceed to operation 406 during which the plurality of spacers may be generated based on the second plurality of dimensions. In various embodiments, the spacers may also be generated using a 3D printing process. As similarly discussed above, the second dimensions may be provided to a 3D printer, and the 3D printer may fabricate one or more of the spacers as part of the automated manufacturing process. Moreover, as similarly discussed above, the spacers may be tooled from a material such as metal or may be generated using DMLS. As previously discussed, various parameters or dimensions of the spacers may affect the flow properties and performance of associated flow paths which may include flow paths 132, 134, 136, 304, and 306. For example, spacers that are larger and or placed closer together may provide increased flow resistance in a flow path. Moreover, a shorter height of spacers as well as their associated flow path may also provide an increased flow resistance relative to taller spacers and taller flow paths. The opposite may be true for spacers that are smaller and/or placed farther apart as well as spacers and flow paths that are taller.

Method 400 may proceed to operation 408 during which the at least some of the plurality of spacers may be joined with the at least one baffle layer. In some embodiments, if a 3D printing process is implemented, the joining during operation 408 may be part of the same printing process implemented for the spacers. Accordingly, the spacers may be printed directly on the baffle layer, and may be joined with the baffle layer via their concurrent generation during the same printing process. In various embodiments, where a metal material is used, the spacers may be soldered or welded to the baffle layers. In various embodiments, the spacers as well as the baffle layers may be created using DMLS. Accordingly, operations 404, 406, and 408 may be implemented as part of one manufacturing or fabrication operation that utilizes DMLS to form a contiguous structure, such as flow medium 114, that includes the at least one baffle layer and the spacers.

Method 400 may proceed to operation 410 during which it may be determined whether or not additional baffle layers and/or spacers should be generated. In various embodiments, such a determination may be made based on the dimensions determined during operation 402 which may be stored in a computer assisted design (CAD) model. For example, if a first baffle layer has been generated, but a second and third baffle layer still remain, it may be determined that additional baffle layers should be generated. If it is determined that additional baffle layers and/or spacers should be generated, method 400 may return to operation 404. If it is determined that additional baffle layers and/or spacers should not be generated, method 400 may terminate.

Figure 5:
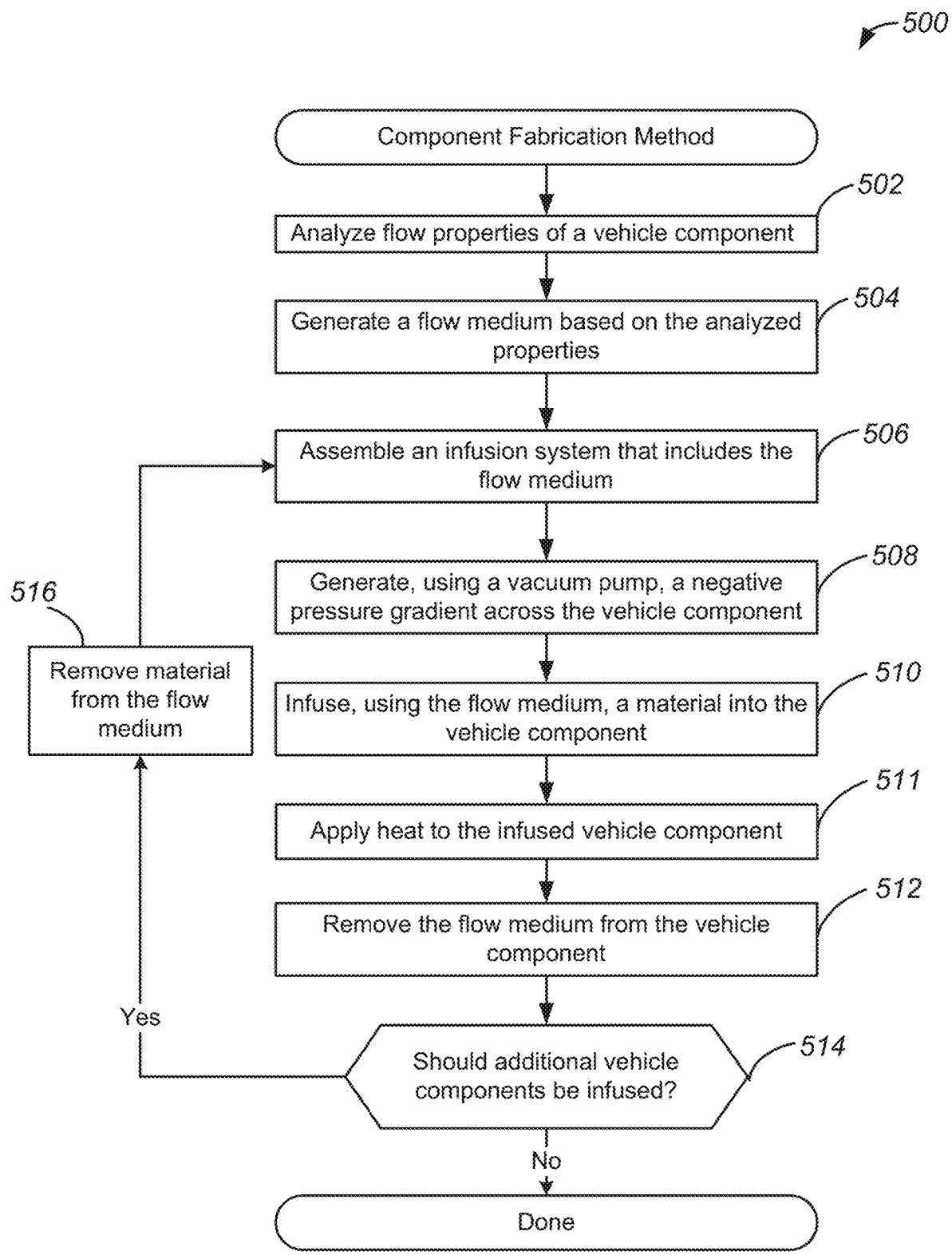
FIG. 5 illustrates a flow chart of an example of a component fabrication method, implemented in accordance with some embodiments

FIG. 5 illustrates a flow chart of an example of a component fabrication method, implemented in accordance with some embodiments. As discussed above, the controlling of flow of a material through a vehicle component, such as vehicle component 108, may be part of a manufacturing and assembly process. Accordingly, method 500 may be implemented to facilitate the manufacture of vehicle component 108 as well as other vehicle components.

Accordingly, method 500 may commence with operation 502 during which flow properties of vehicle component 108 may be analyzed. As discussed above, a computational fluid dynamics analysis may be implemented to identify convergences of flow fronts within vehicle component 108. Moreover, the computational fluid dynamics analysis and/or an analysis performed by an assembly worker may be implemented to identify dimensions and features of a flow medium, such as flow medium 114, based on the identified convergences. Accordingly, the number of baffle layers, shape of the baffle layers, number of spacers, dimensions of spacers, and density of spacers may all be configured based on the computational fluid dynamics analysis, and may be specific to the flow properties of vehicle component 108.

Method 500 may proceed to operation 504 during which flow medium 114 may be generated based on the analyzed properties. Accordingly, based on the determined dimensions, flow medium 114 may be generated by a manufacturing process, such as a 3D printing process. As similarly discussed above, other manufacturing processes may be implemented as well, such as a tooling process. In this way, flow medium 114 may be manufactured or generated using various different materials ranging from metals to polymers.

Method 500 may proceed to operation 506 during which an infusion system may be assembled. As discussed above, the system may include flow medium 114. Accordingly, during operation 506, vehicle component 108 and flow medium 114 may be placed within system 100 and may be sealed by film 112. In various embodiments, the assembly may be performed by the assembly worker. In some embodiments, the assembly may be performed by an assembly robot as part of an automated process.

Method 500 may proceed to operation 508 during which a negative pressure gradient may be generated by vacuum pump 106. As previously discussed, vacuum pump 106 may be activated and generate a vacuum within the sealed portion of system 100. Accordingly, a negative pressure gradient may be generated across vehicle component 108 and flow medium 114, and may facilitate the movement of a material, such as resin, from material source 102 into vehicle component 108.

Method 500 may proceed to operation 510 during which a material may be infused into vehicle component 108. As previously discussed with reference to FIGS. 3A-3F, as the negative pressure gradient continues to be applied to vehicle component 108 and flow medium 114, the material is pulled along various flow paths in accordance with the flow properties of vehicle component 108 as well as flow properties of flow medium 114. As previously discussed, during the infusion, the progression of material through vehicle component 108 may be controlled such that the convergence of flow fronts is reduced. In this way, the modification of flow provided by flow medium 114 ensures that the incidence of the dry spots that were identified during operation 502 is reduced.

Method 500 may proceed to operation 511 during which heat may be applied to infused vehicle component 108. In various embodiments, the application of heat to infused vehicle component 108 solidifies and cures the material that has been infused. Accordingly, one the application of heat has been completed, the material provides vehicle component with increase structural support and reinforcement. In this way, infused vehicle component 108 may be structurally reinforced by the infusion of a material, such as resin. Moreover, because the infusion was implemented using flow medium 114, the incidence of dry spots has been reduced, and the strength of vehicle component 108 has been increased.

Method 500 may proceed to operation 512 during which the flow medium may be removed from the vehicle component. Accordingly, a system, such as system 100, may be disassembled such that flow medium 114 may be removed from system 100 after the curing process. Accordingly, once the infusion of vehicle component 108 has been completed, flow medium 114 may be removed and vehicle component 108 may have a substantially markoff-free upper surface.

Method 500 may proceed to operation 514 during which it may be determined whether or not additional vehicle components should be infused. Such a determination may be made based on parameters of a broader manufacturing process in which method 500 may be implemented. For example, if there are numerous similar parts or components to be manufactured for a single vehicle, or if there are numerous vehicles to be manufactured, it may be determined that additional components should be infused. If it is determined that additional vehicle components should be infused, method 500 may proceed to operation 516 during which material may be removed from flow medium 114. For example, if flow medium 114 is made of metal, flow medium 114 may be placed in an incinerator and any residual material that remains in flow medium 114 may be burned away. If flow medium 114 is made of a polymer via a 3D printing process, operation 516 might not be performed, and method 500 may return to operation 504. If it is determined that no additional vehicle components should be infused, method 500 may terminate.

Figure 6:
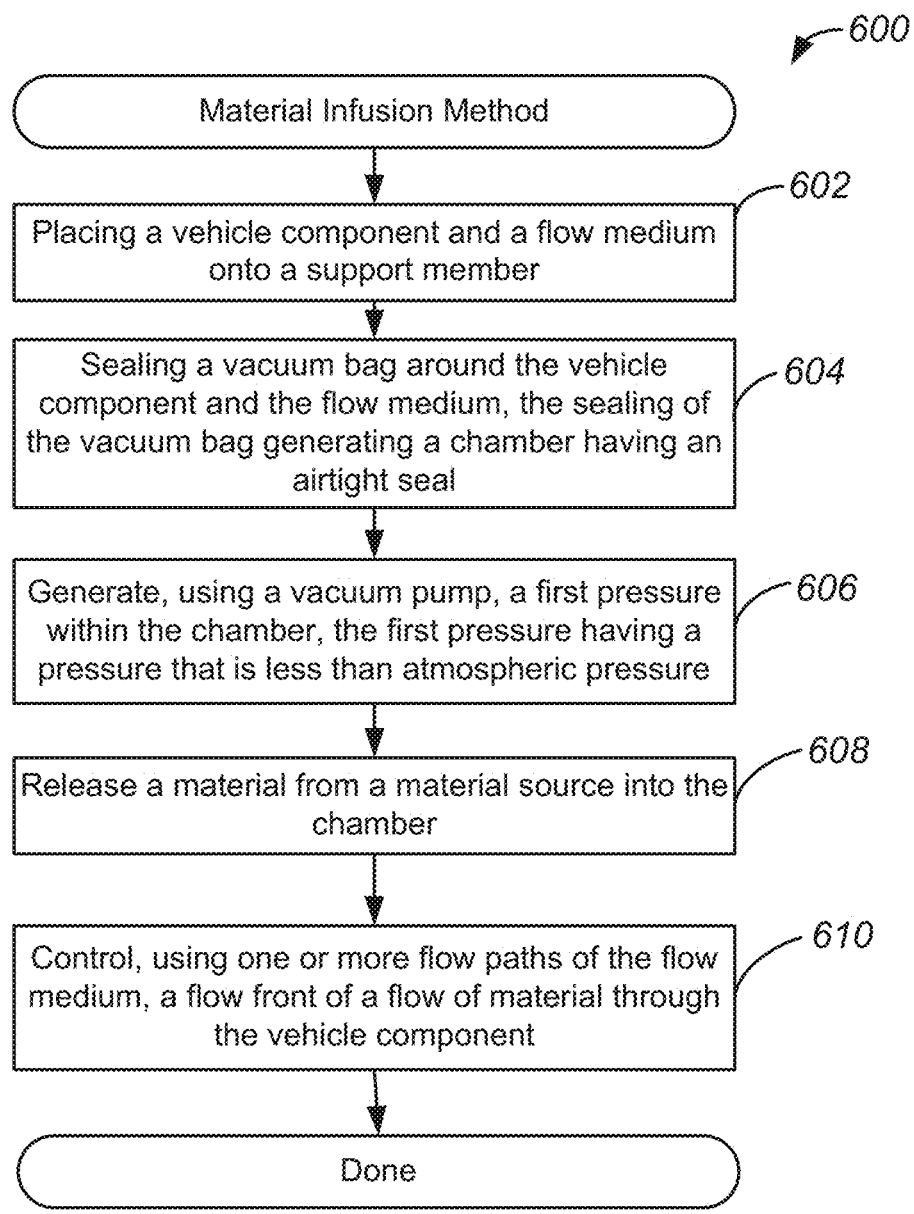
FIG. 6 illustrates a flow chart of an example of a material infusion method, implemented in accordance with some embodiments.

FIG. 6 illustrates a flow chart of an example of a material infusion method, implemented in accordance with some embodiments. As discussed above, system 100 may be used to infuse a material into vehicle component 108. In some embodiments, a material infusion method, such as method 600, may be implemented using system 100. Accordingly, method 600 may commence with operation 602 during which a vehicle component and a flow medium may be placed onto a support member. As previously discussed, a vehicle component, such as vehicle component 108 may be positioned on tool or mandrel-support member 104, and a flow medium, such as flow medium 114 may be placed on top of vehicle component 108. As discussed above, flow medium 114 may include various baffle layers 116, 118, 120, 122, 124, and 126 and spacers, such as spacer 128, that may be configured based on flow properties of vehicle component 108.

Method 600 may proceed to operation 604 during which a vacuum bag may be sealed around the vehicle component and the flow medium. In various embodiments, the sealing of the vacuum bag generates a chamber having an airtight seal. In various embodiments, the vacuum bag may be a bagging film, such as film 112. Accordingly, film 112 may be placed over flow medium 114, and peripheral edges of film 112 may be sealed such that the surface of film 112 facing flow medium 114 forms a boundary of the airtight chamber. In various embodiments, the airtight chamber formed by film 112 may be configured such that material source 102 and vacuum pump 106 may be coupled with and may interact with flow medium 114 and vehicle component 108 without degrading the airtight seal.

Method 600 may proceed to operation 606 during which a first pressure may be generated within the chamber. Accordingly, vacuum pump 106 may be activated and may generate a first pressure, which may be a relative vacuum, within the airtight chamber formed by film 112. As disclosed herein, the first pressure or vacuum generated by vacuum pump 106 may refer to a pressure that is less than an atmospheric pressure, and may be less than a pressure within material source 102. Accordingly, the vacuum may be generated and applied at one end of flow medium 114 and vehicle component 108, and may generate vacuums within flow paths of flow medium 114 and vehicle component 108, such as flow paths 132, 134, 136, 304, and 306.

Method 600 may proceed to operation 608 during which a material may be released from a material source into the chamber. Accordingly, material source 102 may release the material that is to be infused into vehicle component 108. As previously discussed, the material may be a resin that may be used to fortify preform-laminates. Once released from material source 102, the vacuum generated by vacuum pump 106 may pull the resin through vehicle component 108 and through various flow paths, such as flow paths 132, 134, 136, 304, and 306, as similarly discussed above with reference to FIGS. 3A-3F.

Method 600 may proceed to operation 610 during which a flow front of a flow of material through vehicle component 108 may be controlled. In various embodiments, the flow front may be controlled using one or more flow paths of flow medium 114. Accordingly, as the material is pulled through vehicle component 108, a flow front or leading edge 302 may contact and interact with different flow paths 132, 134, 136, 304, and 306. As discussed above, each of the flow paths may have flow properties, such as a flow resistance, which may be configured to influence local flow at interfaces associated with flow paths 132, 134, 136, 304, and 306. Accordingly, as leading edge 302 progresses through vehicle component 108, flow properties of flow paths 132, 134, 136, 304, and 306 may selectively modify flow along the flow front represented by leading edge 302 such that the flow front does not converge at some areas and leave dry spots or undersaturated spots at others. In this way, flow medium 114 may control a flow of material throughout the entirety of vehicle component 108 and ensure that undersaturation and oversaturation of different portions of vehicle component 108 is reduced.

Figure 7:
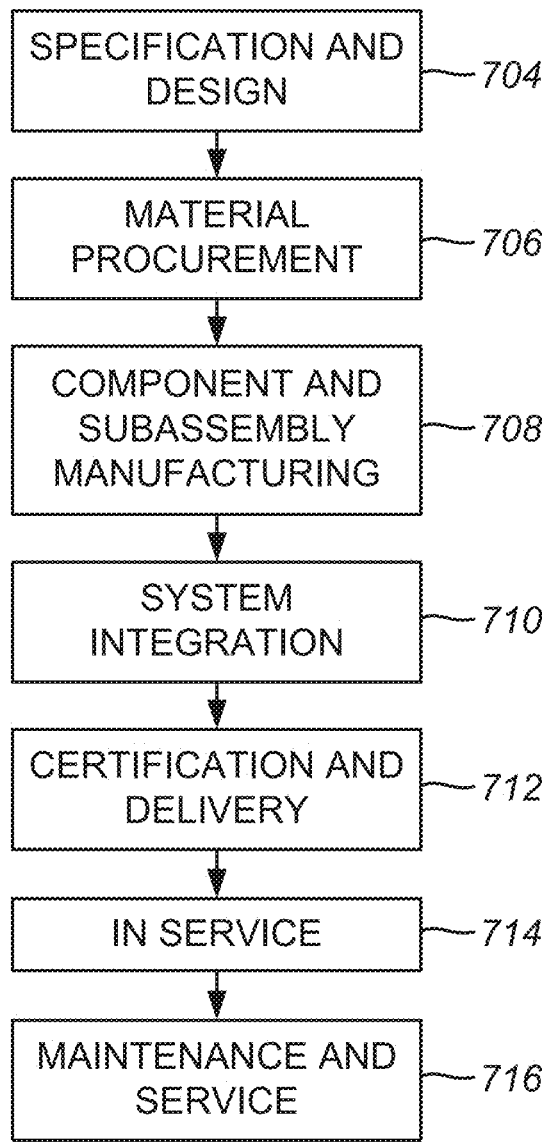
FIG. 7 illustrates a flow chart of an example of an aircraft production and service methodology, implemented in accordance with some embodiments.
Figure 8:
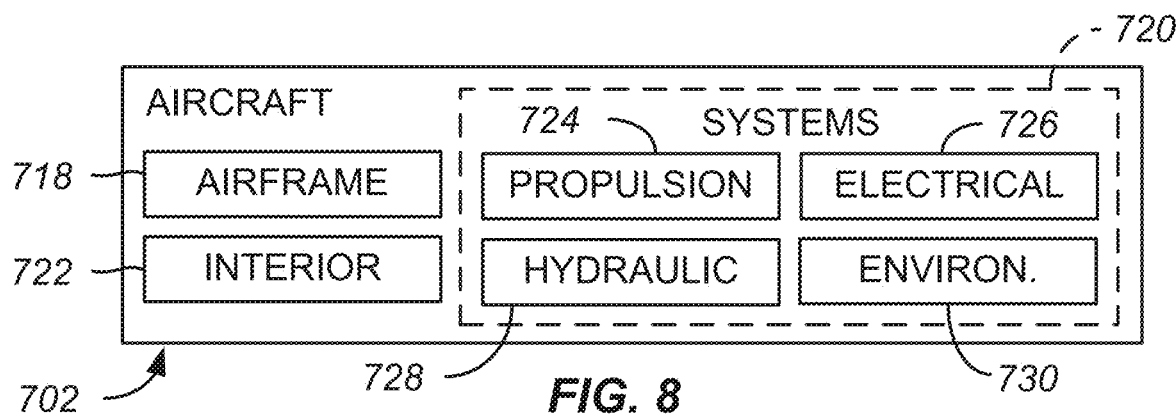
FIG. 8 illustrates a block diagram of an example of an aircraft, implemented in accordance with some embodiments.

Embodiments of the disclosure may be implemented in combination with an aircraft manufacturing and service method 700 as shown in FIG. 7 and an aircraft 702 as shown in FIG. 8. During pre-production, illustrative service method 700 may include specification and design 704 of the aircraft 702 and material procurement 706. During production, component and subassembly manufacturing 708 and system integration 710 of the aircraft 702 takes place. Thereafter, the aircraft 702 may go through certification and delivery 712 in order to be placed in service 714. While in service by a customer, the aircraft 702 is scheduled for routine maintenance and service 716 (which may also include modification, reconfiguration, refurbishment, and so on). Accordingly flow medium 114 may be implemented in conjunction with operations such as component and subassembly manufacturing 708 and system integration 710, and components of assemblies such as airframe 178 and interior 722 discussed in greater detail below.

Each of the processes of service method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8, the aircraft 702 produced by illustrative method 700 may include an airframe 718 with a plurality of systems 720 and an interior 722. Examples of high-level systems 720 include one or more of a propulsion system 724, an electrical system 726, a hydraulic system 728, and an environmental system 730. Any number of other systems may be included. Although an aerospace example is shown, the principles of the invention may be applied to other industries, such as the automotive industry.

Apparatus and methods embodied herein may be employed during any one or more of the stages of the production and service method 700. For example, components or subassemblies corresponding to production operation 708 may be fabricated or manufactured in a manner similar to components or subassemblies produced while the aircraft 702 is in service. Also, one or more apparatus embodiments, method embodiments, or a combination thereof may be utilized during the production operations 708 and 710, for example, by substantially expediting assembly of or reducing the cost of an aircraft 702. Similarly, one or more of apparatus embodiments, method embodiments, or a combination thereof may be utilized while the aircraft 702 is in service, for example and without limitation, to maintenance and service 716.

Figure 9:
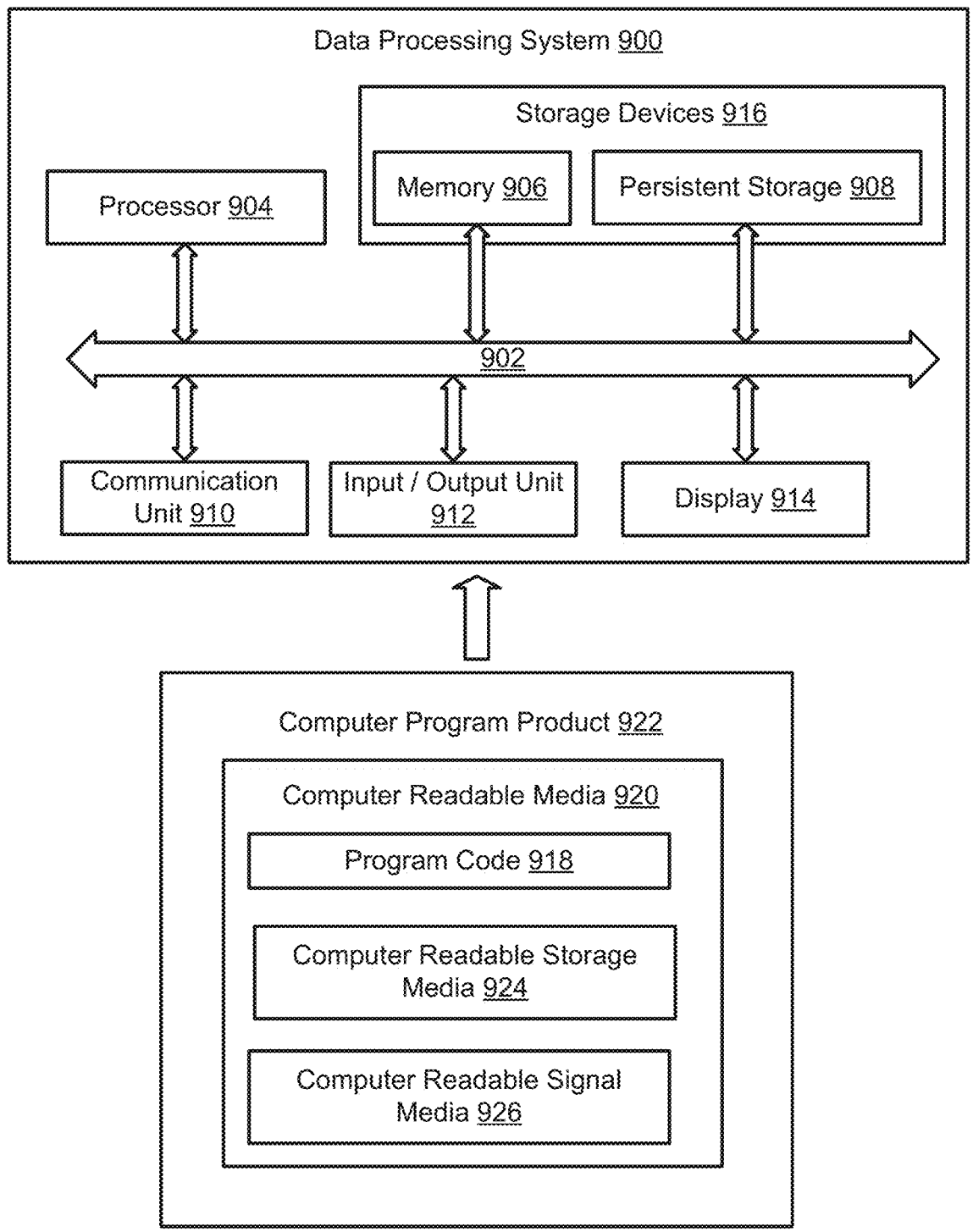
FIG. 9 illustrates a data processing system configured in accordance with some embodiments.

FIG. 9 illustrates a data processing system configured in accordance with some embodiments. Data processing system 900, also referred to herein as a computer system, may be used to implement one or more computers or processing devices used in a controller, server, or other components of systems described above. In some embodiments, data processing system 900 includes communications framework 902, which provides communications between processor unit 904, memory 906, persistent storage 908, communications unit 910, input/output (I/O) unit 912, and display 914. In this example, communications framework 902 may take the form of a bus system.

Processor unit 904 serves to execute instructions for software that may be loaded into memory 906. Processor unit 904 may be a number of processors, as may be included in a multi-processor core. In various embodiments, processor unit 904 is specifically configured to process large amounts of data that may be involved when generating and utilizing computational flow models, as discussed above. Thus, processor unit 904 may be an application specific processor that may be implemented as one or more application specific integrated circuits (ASICs) within a processing system. Such specific configuration of processor unit 904 may provide increased efficiency when processing the large amounts of data involved with the previously described systems, devices, and methods. Moreover, in some embodiments, processor unit 904 may include one or more reprogrammable logic devices, such as field-programmable gate arrays (FPGAs), that may be programmed or specifically configured to optimally perform the previously described processing operations in the context of large and complex data sets associated with computational modeling of material flow through a vehicle component.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer readable storage devices in these illustrative examples. Memory 906, in these examples, may be, for example, a random access memory or any other suitable volatile or non-volatile storage device. Persistent storage 908 may take various forms, depending on the particular implementation. For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these illustrative examples. In one example, computer readable media 920 may be computer readable storage media 924 or computer readable signal media 926.

In these illustrative examples, computer readable storage media 924 is a physical or tangible storage device used to store program code 918 rather than a medium that propagates or transmits program code 918.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 900 are not meant to provide architectural limitations to the manner in which different embodiments may be implemented. The different illustrative embodiments may be implemented in a data processing system including components in addition to and/or in place of those illustrated for data processing system 900. Other components shown in FIG. 9 can be varied from the illustrative examples shown. The different embodiments may be implemented using any hardware device or system capable of running program code 918.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A method for generating a flow medium associated with a vehicle component, the method comprising: determining a first plurality of dimensions and a second plurality of dimensions associated with a flow medium based on one or more flow properties of the vehicle component, the flow medium comprising a plurality of baffle layers and a plurality of spacers, wherein the plurality of baffle layers comprises a bottom baffle layer and more than one baffle layers arranged on top of the bottom baffle layer and each baffle layer of the plurality of baffle layers has a contour, and wherein at least one space between at least some of the plurality of baffle layers defines at least one flow path, and wherein each baffle layer of the plurality of baffle layers has an edge having a contour defining, at least in part, an area of contact between the baffle layer and the vehicle component, the edge being a leading edge that faces a material source; fabricating the plurality of baffle layers based on the first plurality of dimensions; and fabricating at least some of the plurality of spacers based on the second plurality of dimensions, the plurality of spacers being positioned on top of the at least one baffle layer.

2. The method of claim 1, wherein the first plurality of dimensions and the second plurality of dimensions are determined based on a computational analysis of material flow through the vehicle component.

3. The method of claim 2, wherein the computational analysis identifies at least one convergence in a flow front of a flow of the material through the vehicle component.

4. The method of claim 1, wherein the generating of the at least one baffle layer and the generating of the at least some of the plurality of spacers comprise three dimensional printing of the at least one baffle layer and the at least some of the plurality of spacers.

5. The method of claim 1, wherein the at least one baffle layer comprises a first baffle layer, and wherein the method further comprises generating a second baffle layer on top of the plurality of spacers.

6. The method of claim 1, wherein the vehicle component is a component of an aircraft.

7. The method of claim 1, further comprising:
placing the vehicle component and the flow medium onto a support member;
sealing a vacuum bag around the vehicle component and flow medium, the sealing of the vacuum bag generating a chamber having an airtight seal, the chamber being coupled to a material source and a vacuum pump; and
controlling, using one or more flow paths of the flow medium, a flow front of a flow of material through the vehicle component.

8. The method of claim 7, wherein the one or more flow paths comprise a first flow path formed by a first baffle layer and a second baffle layer, the first flow path having at least one flow property determined, at least in part, by a first plurality of spacers positioned between the first baffle layer and the second baffle layer.

9. The method of claim 8, wherein the one or more flow paths further comprise a second flow path formed by a third baffle layer and a fourth baffle layer, the second flow path having at least one flow property determined, at least in part, by a second plurality of spacers positioned between the third baffle layer and the fourth baffle layer.

10. The method of claim 7 further comprising:
generating, using the vacuum pump, a first pressure within the chamber, the first pressure being less than an atmospheric pressure; and
releasing the material into the chamber, the material being released from the material source.

11. The method of claim 7, wherein the material is a resin, and wherein the vehicle component is a preform-laminate.

12. The method of claim 1, wherein the contour is determined based, at least in part, on a shape of a portion of the vehicle component that has a first one of the one or more flow properties, and wherein the first flow property of the vehicle component identifies at least one convergence in a flow front of a flow of the material through the vehicle component.

13. The method of claim 12, wherein a height and width of the first plurality of spacers determine, at least in part, a second one of the one or more flow properties, and wherein the second flow property is inversely proportional to the first flow property.

14. The method of claim 12, wherein a density of the plurality of spacers per unit of area of the plurality of baffle layers determines, at least in part, a second one of the second flow properties, and wherein the second flow property is inversely proportional to the first flow property.

15. The method of claim 1, wherein the plurality of baffle layers comprises a first baffle layer and a second baffle layer, and wherein the first plurality of spacers is positioned between the first baffle layer and the second baffle layer.

16. The method of claim 15, the flow medium further comprising a second plurality of spacers, wherein the baffle layers comprises a third baffle layer and a fourth layer baffle layer, and wherein the second plurality of spacers is positioned between the third baffle layer and the fourth baffle layer.

17. The method of claim 16, wherein a first contour of the first baffle layer, a second contour of the second baffle layer, a third contour of the fourth baffle layer, and a fourth contour of the fourth baffle layer have different dimensions.

18. The method of claim 1, further comprising releasing the material into the chamber, the material being released from the material source.

19. The method of claim 1, wherein the material is a resin.

20. The method of claim 12, wherein a height and width of the first plurality of spacers determine, at least in part, a second one of the one or more flow properties, wherein a density of the plurality of spacers per unit of area of the plurality of baffle layers determines, at least in part, a second one of the second flow properties.

* * * * *